United States Patent
Berg et al.

(10) Patent No.: US 6,648,096 B2
(45) Date of Patent: Nov. 18, 2003

(54) METHOD AND DEVICE FOR DETERMINING A STEERING ANGLE OF A MOTOR VEHICLE

(75) Inventors: Philipp Berg, Wiesbaden (DE); Wolfgang Porth, Frankfurt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/004,297

(22) Filed: Oct. 31, 2001

(65) Prior Publication Data

US 2002/0050417 A1 May 2, 2002

(30) Foreign Application Priority Data

Oct. 27, 2000 (DE) .......................................... 100 53 719
Nov. 21, 2000 (DE) .......................................... 100 57 674

(51) Int. Cl.[7] .............................................. B62D 15/02
(52) U.S. Cl. ........................................ 180/444; 701/41
(58) Field of Search ............................... 180/444, 446, 180/443; 701/41, 42

(56) References Cited

U.S. PATENT DOCUMENTS

| 4,853,672 | A | | 8/1989 | Yasuda et al. ............... 340/465 |
|---|---|---|---|---|
| 4,953,650 | A | | 9/1990 | Ohmura ...................... 180/79.1 |
| 5,573,079 | A | * | 11/1996 | Suda et al. .................. 180/444 |
| 5,668,722 | A | * | 9/1997 | Kaufmann et al. ............ 701/41 |
| 5,791,432 | A | | 8/1998 | Fushimi et al. .............. 180/412 |
| 5,924,518 | A | * | 7/1999 | D'Onofrio .................... 180/444 |
| 6,041,882 | A | * | 3/2000 | Bohner et al. ............... 180/402 |
| 6,163,746 | A | * | 12/2000 | Moerbe ........................ 701/41 |
| 6,227,064 | B1 | * | 5/2001 | Nakamura .............. 74/388 PS |
| 6,295,879 | B1 | * | 10/2001 | Miller et al. ............. 73/862.08 |
| 6,394,218 | B1 | * | 5/2002 | Heitzer ........................ 180/402 |

FOREIGN PATENT DOCUMENTS

| DE | 38 19 837 A1 | 1/1989 | ........... B62D/6/00 |
|---|---|---|---|
| DE | 37 30 926 A1 | 3/1989 | ........... F16J/10/02 |
| DE | 37 30 926 C2 | 3/1989 | ........... F16J/10/02 |
| DE | 198 34 870 A1 | 2/2000 | ........... B62D/6/00 |
| DE | 199 15 105 A1 | 10/2000 | ........... B62D/15/02 |
| EP | 0 376 456 | 11/1989 | ........... B62D/15/02 |
| EP | 0 410 583 | 6/1990 | ........... B62D/3/12 |

* cited by examiner

Primary Examiner—Lesley D. Morris
Assistant Examiner—Tony Winner
(74) Attorney, Agent, or Firm—Richard A. Speer; Mayer, Brown, Rowe & Maw LLP

(57) ABSTRACT

Apparatus and method for detecting the absolute position of a steering column in which a magnetic sensing mechanism associated with the steering mechanism is utilized with a predetermined transmission ratio to obtain an exact steering wheel angle.

17 Claims, 3 Drawing Sheets

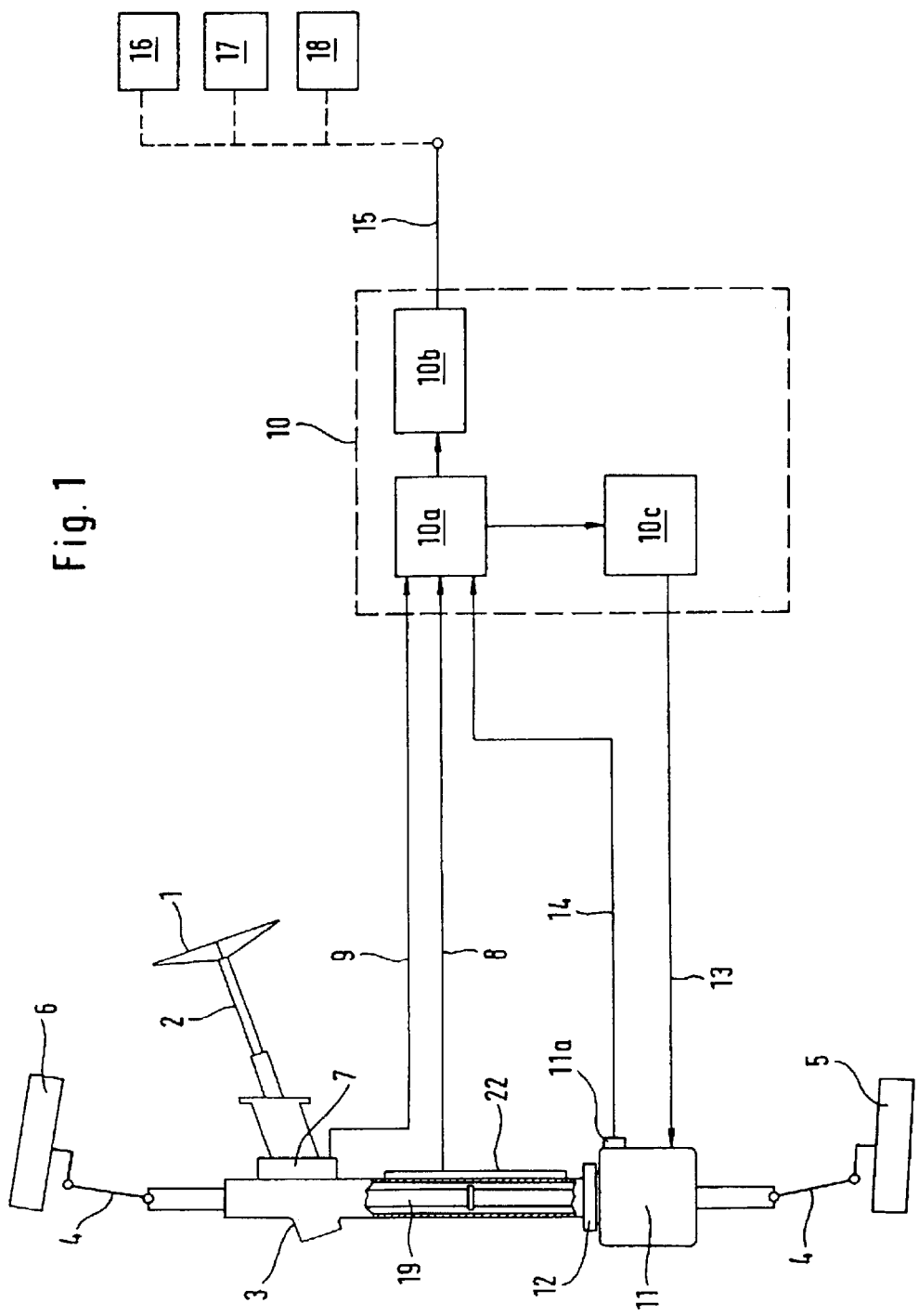

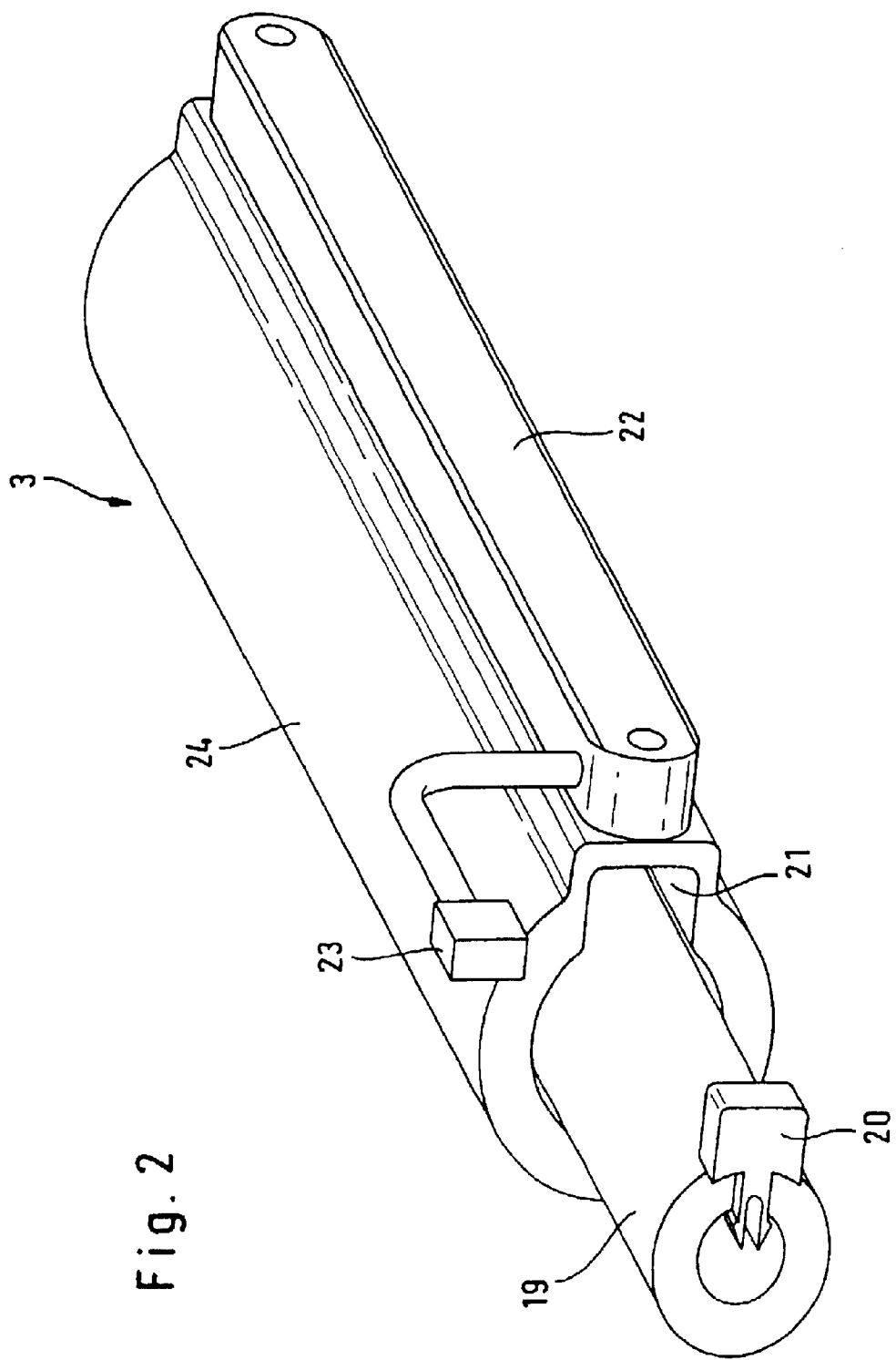

METHOD AND DEVICE FOR DETERMINING A STEERING ANGLE OF A MOTOR VEHICLE

Figure 3A:
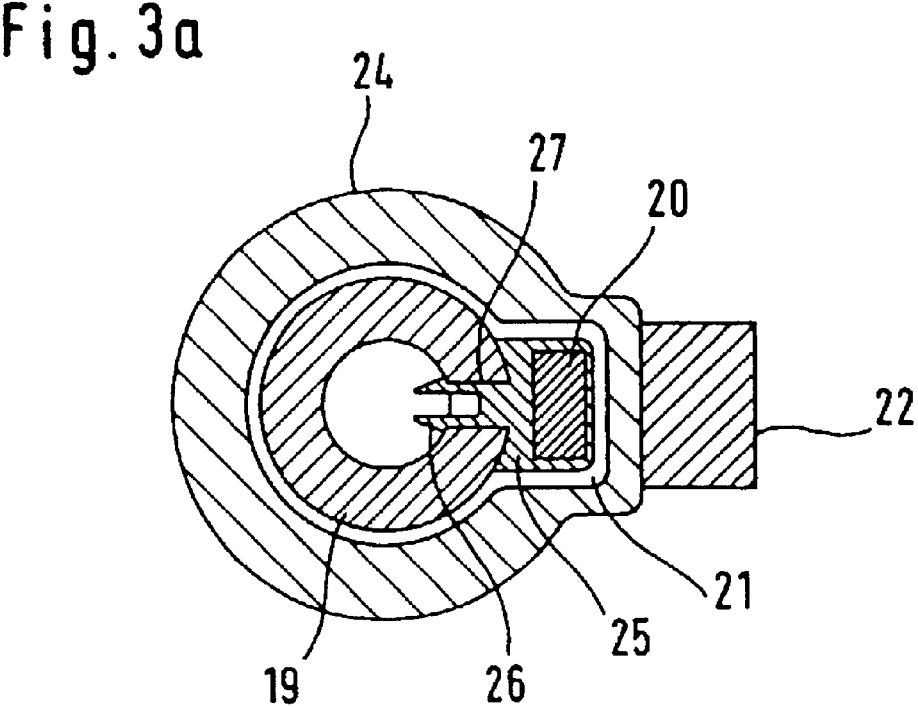

The invention relates to a method for determining a steering angle of a motor vehicle and to a device for carrying out the method.

Electrical steering aids are increasingly used in motor vehicles. In order to function, these aids also require, in addition to the mechanical components, such as the steering shaft and gear, electrical and electronic components, such as an actuating device (electric motor), an electronic control unit and sensor technology. In addition to the sensor technology for detecting the torque exerted on the steering wheel by the driver, this technology being required for the basic functioning of a power steering system, sensor technology for detecting the steering position (for example, steering-wheel angle) is required in order to implement additional comfort and safety functions (active damping/active return).

Steering-angle sensors mounted on the steering shaft, such as are used at the present time, above all, in ESP systems, have to detect the angle of rotation of the steering column over a range which is greater than one revolution of the steering shaft. Costly multi-turn sensors are normally used for detecting the absolute position of the steering shaft.

The object on which the invention is based is to specify a method and device for determining the steering angle, by means of which simple and accurate detection of the absolute position of the steering column is possible.

The object is achieved, according to the invention, in that the displacement travel, caused by a steering-wheel deflection, of a rack of a steering gear is detected, the steering angle being determined from said displacement travel, taking into account a predetermined transmission ratio between the steering-wheel angle and the rack travel.

The advantage of steering-angle detection on the rack is that the steering position can be detected unequivocally over the entire steering-wheel deflection angle, whereas, in the case of a steering-angle sensor on the steering column, this measurement task necessitates an additional revolution counter.

The quantities are in a fixed relation via geometrically defined transmission ratios.

This does away with complicated evaluation methods for determining the absolute position. There is no need to use costly multi-turn sensors. Dispensing with mechanical parts, such as revolution counters and the mounting of the steering-angle sensor in engagement, prevents wear, frictional losses and running noises of the transmission mechanism of the multi-turn sensors.

Advantageously, a motor position signal of a drive motor provided for steering assistance is used for validating the steering angle. The motor angle sensor present per se for another system function within the power steering in the motor vehicle is utilized for validating the steering angle. The angular position of the electric motor is also in a predetermined relation via a fixed transmission ratio with the steering-wheel angle, rack travel and vehicle wheel deflection angle. Additional aids for generating redundant signals may therefore be dispensed with.

In one refinement, the steering angle is determined so as to be used for at least one additional steering function, such as active damping and/or steering return.

The steering angle, once determined for the additional steering function, is taken as a basis for determining further vehicle functions. The steering-angle signal is absolute and is available immediately after the system has been cut in, that is to say there is always direct signal detection.

In another refinement of the invention, a device for determining the steering angle of a motor vehicle is provided, in which a steering shaft is connected to a track rod via a steering gear, the position of the steering shaft being detected by means of a position sensor.

According to the invention, the linear position sensor is arranged on the steering gear designed as a rack mechanism, the position of the rack mechanism detected by means of the linear position sensor corresponding to the absolute position of the steering shaft.

The advantage of this invention is that an unequivocal association of the steering angle and the rack is achieved by the measurement of the rack travel, instead of the angle of rotation of the steering column. The rack travel is linked to the steering-wheel angle via an unequivocal transmission ratio.

Complicated evaluation methods for determining the absolute position are thus dispensed with. There is no need to use costly multi-turn sensors.

To determine the steering angle, the position sensor is connected to a control unit which calculates the steering angle and/or the steering speed and/or the steering direction from the displacement travel of the rack of the rack mechanism.

Advantageously, for the validation of the steering-angle signal, the control unit is connected to a motor position sensor arranged on a drive motor which is operatively connected to the steering gear for steering assistance.

In this case, the signal from the travel sensor is validated by the signal of a motor angle sensor required in any event for commutating the drive motor. The motor angle and rack travel are in a proportional relation, so that redundant signal detection by the control unit is possible. This increases the functional reliability of the steering-angle signal to be detected. Sensor technology which is present per se may also be utilized.

In one refinement, the first control unit is connected to at least one further control unit via a data line, via which the steering angle and/or steering speed and/or steering direction determined by the first control unit can be transmitted, the second control unit further processing the steering angle and/or steering speed and/or steering direction for its control and/or regulating functions.

Utilizing existing interfaces of the first control unit, for example the control unit for power steering, makes it possible to dispense with cost-intensive angle sensors for the ESP control unit.

A particularly simple and cost-effective variant is achieved when the linear position sensor for detecting the position of the rack mechanism operates on a non-contact operating principle.

Advantageously, the linear position sensor has a magnetic device and an inductive sensor unit, the magnetic device being firmly connected to the rack of the rack mechanism and the inductive sensor unit being arranged in or on a housing of the rack mechanism, the inductive sensor unit extending over approximately the entire displacement travel of the rack. By virtue of this arrangement, a particularly simple construction of the system is possible.

In a development of the invention, the inductive sensor unit is fastened to the outside of the housing of the steering gear. In this case, the inductive sensor unit detects the position of the permanent magnet through the housing wall of the steering gear housing. The housing consists of a nonferromagnetic material, for example cast aluminum. The sensor is thus an integral component of the power steering.

Advantageously, the magnetic device is detained mechanically on the rack. The magnetic device can, in this case, approximately comprise the circumference of the rack. Alternatively to this, the magnetic device is arranged in a magnet housing which is fastened to the rack by at least one means for positive and/or non-positive fastening.

Particularly stable fastening can be achieved when the rack is bored hollow and the fastening means is arranged so as to engage behind the rack on the inside through a bore of the latter.

A simple manner of production is possible when the magnet housing and the fastening means are formed in one piece as a plastic injection molding.

In a simple refinement, the housing of the rack mechanism has a magnet receptacle formed in the direction of extent of the rack. The magnetic device is guided, free of friction, in this magnet receptacle, within the steering gear housing, along the inductive evaluation unit which emits an electrical signal corresponding to the position of the magnet and to the angle of rotation of the steering column.

The invention permits numerous embodiments. One of these will be explained in more detail by means of the figures illustrated in the drawing in which:

FIG. 1: shows a steering aid according to the invention
FIG. 2: shows a rack-type steering mechanism
FIG. 3 shows a cross section for the steering gear.
Identical features are given the same reference symbols.

FIG. 1 shows diagrammatically a device according to the invention for steering assistance. A steering column 2 carrying the steering wheel 1 engages into a steering gear 3 which moves the two front wheels 5, 6 of a motor vehicle via a steering linkage 4.

Arranged on the steering column 2 is a steering-torque sensor 7 which is connected to a control unit 10 via the line 9.

Arranged on the steering gear 3 is a linear travel sensor 22 which transmits sensor signals corresponding to the angle of rotation of the steering column 2 to the control unit 10 via the line 8. An electric motor 11 is connected to the rack 19 of the steering gear 3 via a ballscrew mechanism 12. Furthermore, the position of the electric motor 11 detected by a motor position sensor 11a is communicated to the control unit 10 via a further line 14. Via a further line 13, the control unit 10, via its output stage 10b, activates the electric motor 13 as a function of the signal delivered by the steering torque sensor 7, with the result that the steering movement executed by means of the steering wheel 1 is assisted.

The control unit 10 consists, in addition to the output stage 10b, of a controller 10a which is connected to a data line 15 via an interface 10c. This data line 15, preferably a can bus, connects the control unit 10 to further control units of the vehicle, for example a control unit 16 for an electronic stability program (ESP), an ACC control unit 17 (adaptive cruise control) and a navigation unit 18. Furthermore, the control unit 10, via the can bus 15, receives, for example, information on the vehicle speed and the status of the vehicle.

FIG. 2 illustrates a section through the steering gear 3. The steering gear 3 is designed as a rack-type steering mechanism and consists of a rack 19 which is guided inside the steering gear housing 24. A permanent magnet 20 is fastened fixedly to the rack 19, which is manufactured from steel, at a point on the rack 19 which constitutes the start of the measurement range of the steering position of the steering column 2 to be measured.

The steering gear housing 24 has, inside it, a recess 21 which extends over the entire longitudinal extent of the steering gear housing 24 and in which, while the steering aid is in operation, the magnet 20 is displaced within the steering gear housing 24 by the rack 19.

Arranged on the outside of the steering gear housing 24, so as to rest against the magnet receptacle 21, is an inductive transducer unit 22 which is matched in its extent to the displacement travel of the rack 19. The transducer unit 22 has a plug connection 23 for connection to the control unit 10.

Embodiments of the magnet 20 will be explained by means of a cross section through the steering gear housing 24 according to FIG. 3.

It is evident from FIG. 3a that the rack 19 is bored hollow. On the rack 19, the magnet 20, which is mounted in a magnet housing 25, is guided in the magnet receptacle 21 designed as a groove. The inductive transducer unit 22 detects, through the steering gear housing 24, the position of the magnet 20 which, during the rotation of the steering column 2, is displaced as a result of a movement of the rack 19.

The magnet housing 25 is inserted into a bore 27 in the rack 19 by means of a holding device 26 resembling an expanding dowel, in such a way that the holding device 26 engages behind the rack 19. The holding device 26 and the magnet housing 25 in this case form a unit and can be produced in a simple way in a plastic injection molding process.

Figure 3B:
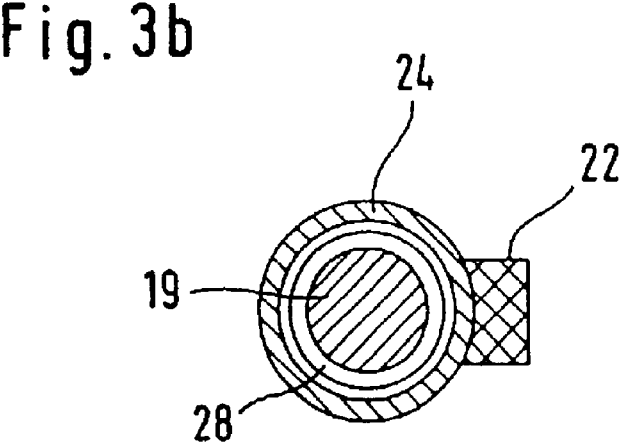

In another possible embodiment according to FIG. 3b, the magnet 20 is designed as an annular magnetic device 28 which surrounds the rack 19 and is fastened positively to the outside of the rack 19.

As an illustration of the dimensions of the arrangement, it may be stated that the outside diameter of the rack 19 is 24 mm, while the magnet 20 is 5×5 mm and the transducer unit 22 and also the magnet receptacle 21 are approximately 200 mm long.

The electrical power steering according to the invention, with a linear travel sensor mounted on the rack-type steering mechanism, makes it possible, in addition to provide a steering-angle signal for other control units of the motor vehicle. The signal from the transducer unit 22 is in this case validated by the signal from the motor angle sensor 11a required in any event for commutating the electric motor 13. The motor angle and rack travel are in a proportional relation, so that redundant signal detection by the control unit 10 is possible. This increases the intrinsic reliability of the steering-angle signal to be detected. Sensor technology present per se may also be utilized.

The steering position signal thus obtained is processed by the control unit 10 of the electrical power steering into a steering angle and steering angle speed signal which is made available to the other vehicle systems, for example to the ESP control unit 16, via the CAN bus 15. The utilization of existing interfaces of the control unit 10 of the power steering makes it possible to dispense with cost-intensive angle sensors for the ESP. The steering-angle signal is absolute and is available immediately after the system is cut in, that is to say there is always direct signal detection.

What is claimed is:

1. A method for determining a steering angle of a motor vehicle, comprising the steps of:
   (a) providing a steering mechanism including (i) a linearly moveable rack with a magnet mounted thereon and (ii) a rotary steering column operably connected to the rack, whereby rotation of the steering column through a steering column angle effects a linear movement of the rack;
   (b) establishing a predetermined transmission ratio between the steering column angle and an amount of rack travel; and (c) determining the steering angle solely by sensing a position of the rack after movement thereof.

2. A method for determining a steering angle of a motor vehicle, comprising the steps of:
   (a) providing a steering mechanism including (i) a linearly moveable rack with a magnet mounted thereon and (ii) a rotary steering column operably connected to the rack, whereby rotation of the steering column through a steering column angle effects a linear movement of the rack;
   (b) establishing a predetermined transmission ratio between the steering column angle and an amount of rack travel;
   (c) determining the steering angle solely by sensing a position of the rack after movement thereof; and
   (d) validating the steering angle by a motor position signal from a drive motor provided for steering assistance.

3. The method as claimed in claim 2, characterized in that the steering angle is taken as a basis for determining further vehicle functions.

4. The method as claimed in claim 3, characterized in that the steering angle is determined so as to be used for at least one additional steering function.

5. The method as claimed in claim 4, characterized in that the data characterizing the steering angle are transmitted via a data bus of the motor vehicle from a first control unit implementing the additional steering function to a second control unit controlling a further vehicle function.

6. A apparatus for determining a steering angle of a motor vehicle comprising:
   (a) a rotatable steering column having a rotatable gear mounted thereon;
   (b) a rack gear disposed within a gear housing and operably connected to the rotatable gear for a linear movement when the steering column is rotated;
   (c) a single permanent magnet mounted on the rack gear;
   (d) an inductive transducer unit positioned operatively adjacent the rack and the permanent magnet to identify a position of the magnet and produce an output signal indicative of the steering angle;
   (e) a steering gear drive motor; and
   (f) a motor position sensor connected to a control unit and to the drive motor for effecting steering assistance.

7. The apparatus as defined in claim 6, the control unit is connected to a motor position sensor arranged on a drive motor which is operatively connected to the steering gear for steering assistance.

8. The device as claimed in claim 6, characterized in that the first control unit is a connected to at least one further control unit via a data line, via which the steering angle and/or a steering speed and/or a steering direction determined by the first control unit can be transmitted to a second control unit, the second control unit further processing the steering angle and/or steering speed for its control and/or regulating functions.

9. An apparatus for determining a steering angle of a motor vehicle comprising:
   (a) a rotatable steering column having a rotatable gear mounted thereon;
   (b) a rack gear disposed within a gear housing and operably connected to the rotatable gear for a linear movement when the steering column is rotated;
   (c) a single permanent magnet mounted on the rack gear;
   (d) an inductive transducer unit positioned operatively adjacent the rack and the permanent magnet to identify a position of the magnet and produce an output signal indicative of the steering angle.

10. The device as claimed in claim 9, wherein the inductive transducer unit in a housing and the inductive transducer unit extends as a function of the entire displacement travel of the rack.

11. The device as claimed in claim 10, characterized in that the inductive transducer unit is fastened to an outside of the housing of the rack gear.

12. The device as claimed in claim 10, characterized in that the magnet is mounted mechanically on the rack.

13. The device as claimed in claim 10, characterized in that the magnet approximately surrounds the rack.

14. The device as claimed in claim 13, characterized in that the magnet is arranged in a magnet housing which is connected to the rack by at least one mechanical fastener.

15. The device as claimed in claim 14, characterized in that the rack is bored hollow and the fastener engages behind the rack on the inside through a bore of a latter.

16. The device as claimed in claim 14 or 15, characterized in that the magnet housing and the fastener are formed in one piece as a plastic injection molding.

17. The device as claimed in claim 10 or 12, characterized in that the housing of the rack mechanism has a magnetic-device receptacle formed in a direction of extent of the rack.

\* \* \* \* \*